United States Patent [19]

Torii et al.

[11] Patent Number: 5,332,517
[45] Date of Patent: Jul. 26, 1994

[54] METHOD FOR PRODUCING CARBONACEOUS POWDER FOR ELECTRORHEOLOGICAL FLUID

[75] Inventors: Takayuki Torii; Takashi Haraoka; Katsuhiro Nagayama; Hitomi Hatano; Noriyoshi Fukuda, all of Chiba; Yuichi Ishino, Kodaira; Takayuki Maruyama, Kodaira; Tasuku Saito, Kodaira, all of Japan

[73] Assignees: Kawasaki Steel Corporation; Bridgestone Corporation, Japan

[21] Appl. No.: 987,121

[22] Filed: Dec. 8, 1992

[30] Foreign Application Priority Data

Dec. 10, 1991 [JP] Japan .................. 3-326110
Dec. 13, 1991 [JP] Japan .................. 3-330303
Apr. 28, 1992 [JP] Japan .................. 4-109693

[51] Int. Cl.$^5$ ............................ C10M 171/00
[52] U.S. Cl. .......................... 252/73; 252/572; 423/460
[58] Field of Search .................. 252/73, 572; 423/460

[56] References Cited

U.S. PATENT DOCUMENTS 5,078,382 2/1992 Ishino et al. .................. 252/73

FOREIGN PATENT DOCUMENTS 406853 1/1991 European Pat. Off. .

Primary Examiner—Christine Skane
Attorney, Agent, or Firm—Bierman and Muserlian

[57] ABSTRACT

A method for producing a carbonaceous powder which can be used as dielectric fine particles to be dispersed in an insulating oil to produce an electrorheological fluid is provided. The method comprises the steps of subjecting a starting organic material selected from the group consisting of coal, coal tar, coal tar pitch, liquefied coal, coke, petroleum, petroleum tar, petroleum pitch, and resins to a heat treatment at a maximum temperature of 300° to 800° C. to produce carbonaceous material; pulverizing and classifying the material to produce carbonaceous particles having a mean particle size of 0.5 to 40 μm and a maximum particle size of up to 50 μm; and subjecting the particles to an additional treatment at an elevated temperature and/or a reduced pressure, said additional treatment being carried out at a temperature lower than said maximum temperature of the heat treatment. The resulting carbonaceous powder may optionally be subjected to a further pulverization treatment.

5 Claims, No Drawings

METHOD FOR PRODUCING CARBONACEOUS POWDER FOR ELECTRORHEOLOGICAL FLUID

BACKGROUND OF THE INVENTION

This invention relates to a method for producing a carbonaceous powder which may be used as dielectric fine particles to be dispersed in an electrorheological fluid. The fluid having the carbonaceous powder of the present invention dispersed therein may exhibit excellent electrorheological properties.

An electrorheological fluid is a fluid which may under go a rapid, reversible change in its apparent viscosity through application of an electric field to exhibit a so called Winslow effect. An electrorheological fluid is generally produced by dispersing dielectric particles in an electric insulating oily medium. Such a characteristic of the electrorheological fluid has been known for many years, and the electrorheological fluid has now become a promising material for many applications including clutches, valves, vibration dampers, and the like.

An electrorheological fluid is generally required to exhibit a large change in its viscosity upon application of a weak electric field and minimize the electric current in the fluid for realizing a higher energetic efficiency. It is also required that the electrorheological fluid may retain its colloidal state without precipitation of the solid particles in the oily medium. It is further required that the properties of the fluid may not degrade (e.g. not lower viscosity change and not raise current value) after prolonged use, and that the properties may hardly be varied by the change of temperature in use. Quick response to an electric field applied are also required.

Conventional electrorheological fluids include dispersions of high dielectric liquid such as water and alcohols, absorbent solid particles such as silica gel, starch, and cellulose in an oily medium having a superior electric insulation such as transformer oil, spindle oil, and chlorinated paraffin. Such fluids are disclosed in U.S. Pat. Nos. 2,886,151 and 3,047,507, and Japanese Patent Application Kokai Nos. 53(1978)-17585, 53(1978)-93186, 61(1986)-44998, 61(1986)-259752, 62(1987)-95397, 1(1989)-207396 and the like. There have also been disclosed dispersions wherein the solid particles are coated with a polymer to overcome various disadvantages caused by the use of water-impregnated solid particles including degradation of properties after prolonged use and poor performance at a high temperature. Such fluids are described in Japanese Patent Application Kokai Nos. 47(1972)-17674 and 63(1988)-97694.

Such conventional electrorheological fluids, however, failed to exhibit performances sufficient for practical use.

In view of such a situation, the inventors of the present invention have proposed a carbonaceous powder which may be used as dielectric particles to be dispersed in a medium exhibit required electrorheological performances. See Japanese Patent Application Kokai No. 3(1991)-279206. This carbonaceous powder has been subjected to a carbonization to a controlled degree, and does not require impregnation with a highly dielectric liquid. More illustratively, the inventors of the present invention have disclosed that the carbonaceous powder which may be used as dielectric powder to be dispersed in an electrorheological fluid may preferably have the following properties:

C/H value which is the ratio in number of carbon atoms to hydrogen atoms in the elemental analysis in the range of from 1.70 to 3.50, and preferably from 2.20 to 3.00;

weight loss determined by Thermal Gravimetric Analysis (hereinafter referred to weight loss value by TGA) at a temperature range of from 400° to 600° C. in nitrogen atmosphere of from 0.5 to 13.0% by weight; and maximum particle size of 50 μm and mean particle size in the range of from 0.5 to 40 μm as determined by Coulter Counter having an aperture tube of 50 μm.

In the above-mentioned Japanese Patent Application Kokai No. 3(1991)-279206, the inventors of the present invention disclosed that the carbonaceous powder having such properties may be produced by a method comprising the steps of subjecting a starting organic material such as coal, coal tar, coal tar pitch, liquefied coal, coke, petroleum, petroleum tar, petroleum pitch, or a resin to a heat treatment at a maximum temperature in the range of from 300° to 800° C., in an autoclave, a kiln, or an electric furnace to reform the material and control its C/H value as well as its content of the components which are volatilizable at a temperature in the range of from 400° to 600° C.

The time required and the temperature in the heat treatment are property selected according to the starting material. When a coal tar pitch is used as a starting material, the heat treatment is processed at a temperature of 400° to 600° C., and at least for five hours. In case of a phenol resin as a starting material used, the heat treatment is processed at the temperature of 500° to 600° C., and at least for 3 hours.

Optionally pulverizing the resulting carbonaceous material with such means as ball mill or jet mill and classifying the material by such means as sifting and air classification.

However, it has been found that the fluid prepared by dispersing such a carbonaceous powder to a certain concentration may frequently exhibit electrorheologically unstable performance, for example, fluctuation in viscosity and electric current upon application of a relatively high voltage for a period as short as approximately ten minutes. Such a lack in stability upon application of a relatively high voltage is quite detrimental for practical use, and therefore, stabilization of the electrorheological properties upon application of a relatively high voltage was critical for practical use of the fluid.

Accordingly, an object of the present invention is to further improve the above-mentioned carbonaceous powder which may be used as dielectric particles for an electrorheological fluid proposed by the present inventors, and provide a method for producing a carbonaceous powder which may be dispersed in a medium to constitute an electrorheological fluid which does not exhibit fluctuation in viscosity or electric current upon application of a high voltage.

Up to now, mechanisms for the development of electrorheological effects are not yet fully revealed. It is, however, believed that, upon application of an electric field to the electrorheological fluid, the particles dispersed therein undergo polarization, and the polarized particles are attracted to each other by electrostatic attraction to result in an increased apparent viscosity of the fluid. Therefore, performance of an electrorheological fluid comprising a dispersion of dielectric particles in an electrically insulating oily medium would definitely be influenced by nature of the particle surface.

From such a point of view, we estimated that the above-described instability in viscosity and electric current of the fluid having the above-described carbonaceous powder dispersed therein is caused by the phenomenon as described below.

In the production of the carbonaceous powder, the organic material is subjected to a heat treatment in order to control its C/H value as well as its weight loss value by TGA to the above mentioned ranges. However, volatile components having low boiling points are not fully expelled from the carbonaceous material in this heat treatment, and when the carbonaceous material is subsequently pulverized, the parts of the material containing the residual volatile components having low boiling points, which were in the interior of the carbonaceous material, were exposed as exterior surface of the resulting particles. Consequently, the thus produced carbonaceous particles had particle surfaces wherein the part containing the residual volatile components having low boiling points are inconsistently distributed. Such an inconsistency of the particle surface resulted in poor electrorheological stability of the fluid in which the particles are dispersed to show the fluctuated viscosity and the electric current.

On the basis of such an estimation, the inventors of the present invention carried out a further investigation and found that the above-described instability of the electrorheological properties may be improved by subjecting the carbonaceous particles to an additional treatment wherein the content of the volatile components having low boiling points in the particle surface is controlled, and that such an additional treatment should be carried out after the pulverization of the carbonaceous material to the final particle size at which the carbonaceous powder is used, namely, dispersed in the electric insulating oil. More illustratively, after the heat treatment of the organic material carried out to control the C/H value and the weight loss value by TGA and the subsequent pulverization and classification, the carbonaceous powder is subjected to an additional treatment at an elevated temperature and/or a reduced pressure carried out at a temperature lower than the maximum temperature of the previous heat treatment (the heat treatment is processed before the pulverization to produce carbonaceous particles having a mean particle size of 0.5 to 40 μm and a maximum particle size of up to 50 μm) to thereby efficiently reduce or remove the low boiling components in the particle surface. The volatile components of the surface have been sufficiently removed. The fluid having dispersed therein the resulting carbonaceous particles having sufficiently consistent, homogeneous surface was found to exhibit quite stable electrorheological properties upon application of a relatively strong electric field. The change of viscosity through application of an electric field is increased without increasing the current. It was also found that the weight loss value by TGA of the thus obtained carbonaceous powder at a temperature range of from a room temperature to 200° C. can be used as a value representing the content of such volatile components having low boiling points. It is to be noted that the additional treatment is to be carried out after the pulverization and the classification of the carbonaceous particles to the final particle size at which the carbonaceous particles are used as the dielectric particles dispersed in the electrorheological fluid, namely, a maximum particle size of up to 50 μm and a mean particle diameter of 0.5 to 40 μm. No improvement in stability would be achieved when such an additional treatment is carried out before the pulverization and the classification of the carbonaceous particles to the final particle size.

However, the inventors of the present invention found out another unexpected problem to be obviated. The fluid having dispersed therein the carbonaceous particles which had been subjected to such an additional treatment at an elevated temperature exhibited an increased apparent viscosity with no application of the electric field (hereinafter referred to as initial viscosity). Such an increase in the initial viscosity of the fluid is quite unfavorable for practical use of the electrorheological fluid.

Initial viscosity of an electrorheological fluid is a quite important property. If the carbonaceous powder exhibits a low initial viscosity upon dispersion in the medium, it would be possible to increase the quantity of the carbonaceous powder dispersed in the fluid to a level that would not exceed the predetermined initial viscosity. An increased quantity of the carbonaceous powder dispersed in the fluid can realize a larger change in electrorheological properties of the fluid upon application of an electric field. Therefore, a carbonaceous powder to be dispersed in an electrorheological fluid as dielectric particles is required to show a low initial viscosity upon dispersion in a fluid.

Increase in the initial viscosity of the electrorheological fluid may occur when the above-mentioned additional treatment is carried out at an excessively high temperature or temperature elevation rate. Such an increase in the initial viscosity is believed to have been caused by the following phenomena.

If the particle surface is exposed to an atmosphere at a temperature higher than the melting point of the components constituting the particle surface in the additional treatment at an elevated temperature and/or reduced pressure, the particle surface would melt and the particles would become fused to each other. Such a fusion of the particles would result in an increased particle size to accelerate precipitation of the particles in the dispersion. Such a fusion of the particles would also produce particles of complicated configuration, for example, in dumbbell shape leading to an increased initial viscosity.

The inventors of the present invention have found that the problem caused by the fusion of the particles may be obviated by subjecting the carbonaceous powder to a still further treatment wherein the carbonaceous powder is pulverized so that the particles which became fused in the additional treatment would be separated, and the carbonaceous powder will restore the particle size before the additional treatment. The initial viscosity will then be decreased to its original level before the additional treatment, and the problem of the increased initial viscosity is thereby obviated.

Therefore, it is the object of the present invention to further improve an excellent carbonaceous powder which may be used as dielectric particles for an electrorheological fluid which were previously proposed by the present inventors, and provide a method for producing a carbonaceous powder which can limit a fluctuation in viscosity (the amount of a fluctuation in viscosity measured for ten minutes and represented by (maximum value−minimum value)/average value×100%) and a fluctuation in current value (the amount of a fluctuation in current value measured for ten minutes and represented by (maximum value—minimum value)/average value×100%) to less than 6% upon application of a relatively strong electric field of 3 kV/mm to the fluid and which does not increase the initial viscosity of the carbonaceous powder.

SUMMARY OF THE INVENTION

According to the first aspect of the invention, there is provided a method for producing a carbonaceous powder for electrorheological fluid, which can be used as dielectric fine particles to be dispersed in an oily medium having a electrical insulating property to produce the electrorheological fluid, comprising the steps of subjecting a starting material comprising an organic compound selected from the group consisting of coal, coal tar, coal tar pitch, liquefied coal, coke, petroleum, petroleum tar, petroleum pitch, and resins to a heat treatment at a maximum temperature of 300° to 800° C. to produce a carbonaceous material;

pulverizing and classifying the material to produce carbonaceous particles having a mean particle size of 0.5 to 40 μm and a maximum particle size of up to 50 μm; and subjecting the particles to an additional treatment at an elevated temperature and/or a reduced pressure, said additional treatment being carried out at a temperature lower than said maximum temperature of the heat treatment (the heat treatment before the pulverization to produce carbonaceous particles having a mean particle size of 0.5 to 40 μm and a maximum particle size of up to 50 μm).

According to the second aspect of the invention, there is provided a method for producing a carbonaceous powder for electrorheological fluid, which can be used as dielectric fine particles to be dispersed in an oily medium having a electrical insulating property to produce the electrorheological fluid, comprising the steps of subjecting a starting material comprising an organic compound selected from the group consisting of coal, coal tar, coal tar pitch, liquefied coal, coke, petroleum, petroleum tar, petroleum pitch, and resins to a heat treatment at a maximum temperature of 300° to 800° C. to produce carbonaceous material;

pulverizing and classifying the material to produce carbonaceous particles having a mean particle size of 0.5 to 40 μm and a maximum particle size of up to 50 μm;

subjecting the particles to an additional treatment at an elevated temperature and/or a reduced pressure, said additional treatment being carried out at a temperature lower than said maximum temperature of the heat treatment (the heat treatment before the pulverization to produce carbonaceous particles having a mean particle size of 0.5 to 40 μm and a maximum particle size of up to 50 μm); and subjecting the particles to a further pulverization treatment.

DETAILED DESCRIPTION OF THE INVENTION

The method for producing carbonaceous powder according to the present invention is further described in detail.

The organic compounds which may be used for producing the carbonaceous powder for electrorheological fluid of the present invention include coal tar, coal tar pitch, liquefied coal, petroleum tar, petroleum pitch, and resins. If the tar or the pitch contains free carbon or ash, it is preferable to first remove such components. For such removal, conventional industrial process may be employed, for example, removal by centrifugation, or by addition of various solvents followed by separation.

The organic starting material is subjected to a heat treatment by such means as autoclave, kiln, fluidized bed, or electric furnace, which may be employed alone or in combination. The heat treatment is carried out at a maximum temperature of from 300° to 800° C. to thereby reform the material and control its C/H value as well as its weight loss value by TGA at a temperature range of from 400° to 600° C. in nitrogen atmosphere.

The C/H value is controlled to the range between 1.70 to 3.50, preferably to the range between 2.00 to 3.50, and most preferably to the range between 2.20 to 3.00. The weight loss value by TGA at a temperature range of 400° to 600° C. in nitrogen atmosphere as determined by Thermal Gravimetric Analysis is controlled to the range between 0.5 to 13.0% by weight, and preferably to the range between 0.5 to 6.0% by weight. Such a control may be achieved by appropriately setting the temperature and the period of the heat treatment. The heat treatment may be carried out either batchwise or in a continuous process. In case of the coal tar pitch as the starting material used, the heat treatment is processed at a temperature of 400° to 600° C. and at least for five hours. In case of the phenol resin as a starting material used, the heat treatment is processed at the temperature of 500° to 600° C. and at least for three hours. The organic material may be heat treated in two or more steps.

The carbonaceous material is pulverized and classified to produce finely divided particles having a mean particle size of from 0.5 to 40 μm, preferably from 2 to 40 μm, and most preferably from 2 to 10 μm, and a maximum particle size of up to 50 μm.

The pulverization may be carried out using conventional apparatus employed in an industrial process such as jet mill and ball mill. The classification may be carried out using conventional means employed in an industrial process such as air classification and sifting.

The carbonaceous powder which has been pulverized and classified to the particle size at which the powder is used in an electrorheological fluid is then subjected to an additional treatment at an elevated temperature and/or at a reduced pressure. The additional treatment conditions are controlled by elevating temperature and/or reducing pressure so that the weight loss value by TGA of the carbonaceous powder at a temperature range of from a room temperature to 200° C. becomes less than 0.01 wt % (detectable limit value by TGA). This additional treatment is carried out at a temperature lower than said maximum temperature of the heat treatment (the heat treatment before the pulverization to produce carbonaceous particles having a mean particle size of 0.5 to 40 μm and a maximum particle size of up to 50 μm). More illustratively, the additional treatment, when conducted at a normal pressure, is carried out at a temperature of at least 50° C., preferably, at a temperature of at least 200° C. When the additional treatment is carried out at a reduced pressure, the treatment may be carried out at a temperature of at least 0° C., preferably at a temperature of at least 50° C., and most preferably at a temperature of at least 100° C.

When the additional treatment is carried out at a reduced pressure, the pressure used may be from 0 to 760 mmHg (absolute pressure), preferably from 1 to 200 mmHg, and most preferably from 0 to 20 mmHg. The heat treatment or the reduced pressure treatment may be carried out individually or simultaneously or serially connected. The volatile components having low boiling points in the surface of the finely divided particles would be effectively reduced or removed by such an additional treatment at an elevated temperature and/or a reduced pressure, and carbonaceous particles having uniform particle surface would be produced without significant alteration in the main properties of the particle including the C/H value.

The electrorheological fluid dispersed the carbonaceous powder of the present invention exhibits stable electrorheological properties, and the change of viscosity through application of an electric field is increased without increasing the current in the fluid.

The present invention can limit both a fluctuation in viscosity and also a fluctuation in current value to less than 6% upon application of a relatively strong electric field of 3 kV/mm to the fluid.

If the additional treatment is carried out at a temperature higher than said maximum temperature of the heat treatment (the heat treatment before the pulverization to produce carbonaceous particles having a mean particle size of 0.5 to 40 μm and a maximum particle size of up to 50 μm), the carbonaceous particles would undergo a substantial change in its main properties including the C/H value. In such a case, the resulting carbonaceous particles, upon dispersion into an insulating oil, would produce an electrorheological fluid having an improved stability in use. The viscosity and the current of the fluid, however, would substantially increase from the untreated carbonaceous powder.

The additional treatment is carried out in such apparatus as kiln, fluidized bed or electric furnace in an inert atmosphere such as nitrogen gas. The treatment is generally conducted for 30 minutes or more depending on the temperature. When the additional treatment is carried out at a reduced pressure, the treatment may generally be carried out for 30 minutes or more.

In the second aspect of the present invention, the carbonaceous powder which has been subjected to the above-described additional treatment which is carried out at an elevated temperature and/or a reduced pressure is further pulverized to produce the carbonaceous particles having a particle size substantially the same as the particle size before the additional treatment. The average particle size of the carbonaceous powder after the additional heat treatment is controlled to a range from 80% to 150% of the average particle size of the carbonaceous powder before the additional heat treatment by the pulverization. When the average particle size is over 150%, the initial viscosity of the fluid having electrorheological properties is high. If the carbonaceous powder is pulverized until its particle size becomes less than 80%, the parts of the carbonaceous material containing the residual low boiling point components are exposed to the surface of the particles as described previously, with the result of large fluctuations in viscosity and current value, which is not preferable. The pulverization of this step may also be carried out using conventional apparatus such as ball mill and hammer mill. Also in the second aspect of the present invention, the additional treatment is carried out under the same conditions as in the first aspect of the invention.

Dispersion of the thus obtained carbonaceous powder in an insulating oil such as transformer oil, spindle oil, chlorinated paraffin, or silicone oil would result in a quite stable fluid having excellent electrorheological properties including a low initial viscosity as well as stable viscosity and electric current upon application of a stronger electric field.

The amount of the content of the carbonaceous powder of the present invention in the electrorheological fluid may be in the range of 1 to 60% by weight, preferably 20 to 50% by weight. When the amount of the content of the carbonaceous powder is less than 1% by weight, the change in viscosity of the fluid may be small. When the amount of the content of the carbonaceous powder is more than 60% by weight, the initial viscosity of the fluid is increased.

Thermal gravimetric analysis of the present invention is illustrated in detail hereinafter.

Thermal gravimetric analysis is a method for analyzing a heat treated carbonaceous powder. Upon heat treatment of a carbonaceous material, both polycondensation and decomposition would be promoted simultaneously to generate various volatilizable components, which may have a boiling point lower than the temperature of the heat treatment. After the heat treatment, such low boiling components may reside in the interior of the mass of the carbonaceous material generated in the course of the heat treatment by the melting and hardening of the carbonaceous material. Since such volatilizable components disperse at a quite slow rate, it is unlikely that such components would be evaporated from the surface of the mass of the material even when the heat temperature is increased to a considerably higher temperature. However, when the carbonaceous material is pulverized, the material near the surfaces which newly became exposed upon pulverization has a high content of such low boiling components. When the pulverized heat treated carbonaceous material is subjected to the thermaal gravimetric analysis, the low boiling components on the newly exposed surfaces would be evaporated upon heat elevation to be detected as an integrated weight loss to indicate content of components volatilizable at a temperature range of from room temperature to 200° C. Such low boiling components, of course, could be removed by a further heat treatment of the pulverized carbonaceous material. The thermal gravimetric analysis of the present invention was carried out under the following conditions.

| | |
|---|---|
| sample weight | 200 mg |
| atmosphere | nitrogen |
| temperature elevation from room temperature | 10° C./min. |
| item measured | weight loss |

The present invention is further described by referring to the following Examples and Comparative Examples, which by no means limit the scope of the present invention.

EXAMPLES

Comparative Example 1

A coal tar containing no free carbon (quinoline insoluble content) was charged in a 20-liter autoclave, and heated to 450° C. for three hours to carry out the heat treatment in nitrogen atmosphere. The thus heat treated material was extracted with a tar middle oil having a boiling point in the range of from 120° to 250° C., and filtered to remove the filtrate. The residuum was charged in a batch-type rotating reaction furnace having an inner volume of 35 liters, and heated to a temperature of 490° C. for three hours in a nitrogen stream of 5.0 liter/min to thereby carry out second heat treatment. The resulting carbonaceous powder having particle size 0.1 mm to 20 mm was pulverized in a jet mill. The pulverized particles were classified with an air classifier to a mean particle size of about 3 μm. The particle size was measured with Coulter Counter using an aperture tube of 50 μm. A particle size of more than 50 μm was not detected with Coulter Counter using an aperture tube of 250 μm. The resulting carbonaceous powder had a C/H value of 2.32. The carbonaceous powder was also measured by TGA (Thermal Gravimetric Analysis) to determine its weight loss.

The weight loss was 3.7% by weight at a temperature range of from 400° to 600° C., and 0.02% by weight at a temperature range of from room temperature to 200° C. In a silicone oil, which is an electrical insulating oily medium, having a viscosity of 10 cp at room temperature was dispersed 36% by weight of the carbonaceous powder to produce an electrorheological fluid.

The thus obtained electrorheological fluid was evaluated for its electrorheological properties by applying an electric field at a strength of 2 kV/mm at room temperature and monitoring the fluid for its viscosity and current flowing therethrough. The viscosity was measured with rotational viscometer provided with concentric inner and outer cylinders between which a DC field is applied. An apparent viscosity was measured at a shear rate of 366/sec. Initial viscosity, which is an apparent viscosity without application of the electric field, at room temperature was 0.65 poise. Upon application of an electric field of 2 kV/mm at room temperature, an increase in the viscosity of 2.6 poise as well as a current at a value of 0.05 mA were observed. Upon continuous application of an electric field of 3 kV/mm, both the viscosity and the current became unstable to show fluctuation in their measurements. The results are shown in Table 1.

Comparative Examples 2

The carbonaceous powder obtained in Comparative Example 1 was charged in batch-type rotating reaction furnace having an inner volume of 35 liters, and heated to a temperature of 350° C. in a nitrogen stream of 5.0 liter/min. A mean particle size was about 5.0 μm, and a particle having more than 50 μm diameter was not detected. The resulting carbonaceous powder had a C/H value of 2.32, and its weight loss determined by TGA was 3.7% by weight at a temperature range of from 400° to 600° C., and less than 0.01% by weight at a temperature range of from room temperature to 200° C. An electrorheological fluid was prepared using such a carbonaceous powder by repeating the procedure of Comparative Example 1.

The thus prepared fluid was evaluated for its electrorheological performance in a manner similar to Comparative Example 1. Initial viscosity at room temperature was 0.90 poise. Upon application of an electric field of 2 kV/mm at room temperature, an increase in the viscosity of 5.5 poise was observed. Even when the electric field applied was increased to 3 kV/mm, both the viscosity and the current were stable to indicate a good electrorheological effect upon such application of the electric field. The results are also shown in Table 1. however, the carbonaceous particles became fused with each other in the additional treatment at an elevated temperature, and the fluid exhibited an initial viscosity higher than that of Comparative Example 1, which is unfavorable for an electrorheological fluid.

Example 1

The carbonaceous powder obtained in Comparative Example 2 was pulverized in an atomizer (hammer mill) to produce a carbonaceous powder having a mean particle size of 3 μm, which mean particle size being the same as the one before the additional heat treatment of Comparative Example 2. A particle having more than 50 μm diameter was not detected. An electrorheological fluid was prepared using such a carbonaceous powder by repeating the procedure of Comparative Example 1.

The thus prepared fluid was evaluated for its electrorheological performance in a manner similar to Comparative Example 1. Initial viscosity at room temperature was 0.64 poise. Upon application of an electric field of 2 kV/mm at room temperature, an increase in the viscosity of 5.5 poise was observed. The results are also shown in Table 1. Since the particles which became fused with each other in the Comparative Example 2 were separated again by the pulverization, the initial viscosity of the electrorheological fluid became significantly lower than that of Comparative Example 2, while the high stability in the viscosity and the current upon application of a relatively strong electric field was maintained. The resulting electrorheological fluid, therefore, was quite favorable.

Example 2

The pulverized, classified carbonaceous powder obtained in Comparative Example 1 was subjected to an additional treatment at a temperature of 200° C. and at an absolute pressure of 1 mmHg for four hours. The resulting carbonaceous powder had a mean particle size of 3.0 μm. A particle having more than 50 μm diameter was not detected. The weight loss value by TGA was less than 0.01% by weight at a temperature range of from room temperature to 200° C. An electrorheological fluid was prepared using such a carbonaceous powder by repeating the procedure of Comparative Example 1.

The thus prepared fluid was evaluated for its electrorheological performance in a manner similar to Comparative Example 1. Upon application of an electric field of 2 kV/mm at room temperature, an increase in the viscosity of 5.5 poise and a current of 0.05 mA were observed. Even when the electric field applied was increased to 3 kV/mm, both the viscosity and the current were quite stable showing no fluctuation. Such a stability is estimated to have been realized by the additional treatment at a reduced pressure of the pulverized, classified carbonaceous particles, by which volatile components having low boiling points were removed from the particle surface to produce a consistent particle surface. The results are also shown in Table 1.

Comparative Example 3

The pulverized, classified carbonaceous powder obtained in Comparative Example 1 was subjected to an additional treatment at a temperature of 250° C. and an absolute pressure of up to 1 mmHg for six hours. The mean particle size of the resulting powder was 4.8 μm and a particle having more than 50 μm diameter was not detected. The resulting carbonaceous powder had a C/H value of 2.32, and its weight loss determined by TGA was 3.7% by weight at a temperature range of from 400° to 600° C., and less than 0.01% by weight at a temperature range of from room temperature to 200° C. An electrorheological fluid was prepared using such a carbonaceous powder by repeating the procedure of Comparative Example 1.

The thus prepared fluid was evaluated for its electrorheological performance in a manner similar to Comparative Example 1. Initial viscosity at room temperature was 0.87 poise. Upon application of an electric field of 2 kV/mm at room temperature, an increase in the viscosity of 5.4 poise was observed. Even when the electric field applied was increased to 3 kV/mm, both the viscosity and the current were quite stable to indicate an improved electrorheological effect of the fluid upon application of such an electric field. The results are also shown in Table 1. The carbonaceous particles, however, became fused with each other in the additional treatment carried out at an elevated temperature and a reduced pressure to result in the initial viscosity of the fluid higher than that of Comparative Example 1. The electrorheological performance of the fluid, therefore, is unfavorable as in the case of Comparative Example 2.

Example 3

The carbonaceous powder obtained in Comparative Example 3 was pulverized in an atomizer (hammer mill), to produce a carbonaceous powder having a mean particle size of 3 μm, which mean particle size being the same as the one before the additional treatment at an elevated temperature and a reduced pressure of Comparative Example 3. A particle having more than 50 μm diameter was not detected. an electrorheological fluid was prepared using such a carbonaceous powder by repeating the procedure of Comparative Example 1.

The thus prepared fluid was evaluated for its electrorheological performance in a manner similar to Comparative Example 1. Initial viscosity at room temperature was 0.64 poise. Upon application of an electric field of 2 kV/mm at room temperature, an increase in the viscosity of 5.3 poise was observed. Since the particles fused with each other in Comparative Example 3 were separated again by the pulverization, the initial viscosity of the electrorheological fluid became significantly lower than that of Comparative Example 3, while the high stability in the viscosity and the current upon application of a relatively strong electric field was maintained. The resulting electrorheological fluid, therefore, was quite favorable.

The results are also shown in Table 1.

EFFECTS OF THE INVENTION

The process of the present invention provides a carbonaceous powder which may be employed for preparing an industrial electrorheological fluid. When the carbonaceous powder prepared by the process of the present invention is dispersed in an insulating oil as dielectric particles, the resulting fluid would be provided with quite excellent electrorheological properties including low initial viscosity as well as stable viscosity and electric current upon application of an electric field. The fluid exhibits a large change in its viscosity upon application of electric field and minimize the electric current in the fluid.

The electrorheological fluid prepared by using the carbonaceous powder prepared by the process of the present invention is not associated with the most serious problem of the conventional electrorheological fluid, namely, the degradation of the properties after prolonged use or high temperature use, such as lowering in viscosity change and increasing the electric current in the fluid, which is caused by the use of water absorbent solid particles. Therefore, the carbonaceous powder prepared by the present process may open up new industrial applications of the electrorheological fluid including clutches, valves, and the like.

We claim:

1. A method for producing a carbonaceous powder for electrorheological fluid, which can be used as dielectric fine particles to be dispersed in an electrical insulating oily medium having an electrical insulating property to produce the electroreheological fluid, comprising the steps of subjecting a starting material comprising an organic compound selected from the group consisting of coal tar, coal tar pitch, liquified coal, coke, petroleum, petroleum tar, petroleum pitch, and resins to a heat treatment at a maximum temperature of 300° to 800° C. to produce a carbonaceous material;

pulverizing and classifying the material to produce carbonaceous particles having a mean particle size of 0.5 to 40 μm and a maximum particle size of up to 50 μm; and subjecting the particles to an additional treatment at a reduced pressure in the range of 0 to 200 mm Hg, said additional treatment being carried out at a temperature lower than said maximum temperature of the heat treatment.

2. The method of claim 1 wherein said heat treatment is carried out so that the heat treated carbonaceous material has a C/H value in the range of 1.70 to 3.50 and exhibits a weight loss as determined by thermal gravimetric analysis carried out in a nitrogen atmosphere at

TABLE 1

|  | C/H | Weight loss* @ ≦200° C., wt % | Mean particle size, μm | Initial viscosity, poise | Upon application of | | | |
|---|---|---|---|---|---|---|---|---|
|  |  |  |  |  | 2 kV/mm | | 3 kV/mm** | |
|  |  |  |  |  | Viscosity increase, poise | Current, mA | Viscosity increase, poise (stability) | Current, mA (stability) |
| C.E.1 | 2.32 | 0.02 | 3.0 | 0.65 | 2.6 | 0.050 | 5 to 6.5 (poor) | 0.11 to 0.13 (poor) |
| C.E.2 | 2.32 | <0.01 | 5.0 | 0.90 | 5.5 | 0.050 | 12.0 ± 0.1 (good) | 0.120 ± 0.001 (good) |
| E.1 | 2.32 | <0.01 | 3.0 | 0.64 | 5.5 | 0.050 | 12.0 ± 0.1 (good) | 0.120 ± 0.001 (good) |
| E.2 | 2.32 | <0.01 | 3.0 | 0.64 | 5.5 | 0.050 | 12.0 ± 0.1 (good) | 0.120 ± 0.001 (good) |
| C.E.3 | 2.32 | <0.01 | 4.8 | 0.87 | 5.4 | 0.050 | 12.0 ± 0.1 (good) | 0.120 ± 0.001 (good) |
| E.3 | 2.32 | <0.01 | 3.0 | 0.64 | 5.3 | 0.050 | 12.0 ± 0.1 (good) | 0.120 ± 0.001 (good) |

*measured by TGA
**the increase in viscosity and the current upon application of 3 kV/mm are values after monitoring for 10 minutes.

a temperature of 400° to 600° C. of up to 13.0% by weight.

3. The method of claim 1 wherein said additional treatment at a reduced pressure is carried out so that the treated material exhibits a weight loss as determined by thermal gravimetric analysis carried out in a nitrogen atmosphere at a temperature of room temperature to 200° C. of less than 0.1% by weight.

4. The method of claim 1 further comprising the step of subjecting the particles to an additional pulverization.

5. The method of claim 4 wherein said additional pulverization is carried out so that the pulverized particles have a mean particle size of 80% to 150% of the mean particle size of the particle before the additional treatment at a reduced pressure.

* * * * *

UNITED STATES PATENT AND TRADEMARK OFFICE
CERTIFICATE OF CORRECTION

PATENT NO. : 5,332,517
DATED : July 26, 1994
INVENTOR(S) : Takayuki Torii, et. al.

It is certified that error appears in the above-indentified patent and that said Letters Patent is hereby corrected as shown below:

Column 13, line 8, claim 3, change "0.1%" to --0.01%--.

Signed and Sealed this

Twenty-fourth Day of January, 1995

Attest:

BRUCE LEHMAN

*Attesting Officer*     *Commissioner of Patents and Trademarks*